US010567264B2

(12) United States Patent
Tyrrell et al.

(10) Patent No.: US 10,567,264 B2
(45) Date of Patent: *Feb. 18, 2020

(54) PROTOCOL TEST DEVICE AND METHOD FOR OPERATING A PROTOCOL TEST DEVICE

(71) Applicant: Rohde & Schwarz GmbH & Co. KG, München (DE)

(72) Inventors: Alexander Tyrrell, Ismaning (DE); Francesco Rossetto, Vaterstetten (DE); William Powell, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,322

(22) Filed: Apr. 6, 2017

(65) Prior Publication Data

US 2018/0295046 A1 Oct. 11, 2018

(51) Int. Cl.
*H04L 12/26* (2006.01)
*H04W 24/06* (2009.01)

(52) U.S. Cl.
CPC .............. *H04L 43/50* (2013.01); *H04L 43/18* (2013.01); *H04W 24/06* (2013.01)

(58) Field of Classification Search
CPC ......... H04L 43/06; H04L 43/18; H04L 43/50; H04W 24/06
See application file for complete search history.

(56) References Cited

U.S. PATENT DOCUMENTS

| 6,466,950 B1 * | 10/2002 | Ono ..................... G06F 16/2315 |
| 6,539,341 B1 * | 3/2003 | Li ....................... G01R 31/3172 |
| | | 702/182 |
| 7,171,324 B1 * | 1/2007 | Pleasant .............. G01R 35/005 |
| | | 324/601 |

(Continued)

FOREIGN PATENT DOCUMENTS

CN 103107870 A * 5/2013 ............ H04W 24/00

OTHER PUBLICATIONS

3GPP, Technical Specification 37.320, Radio measurement collection for Minimization of Drive Tests (MDT), Mar. 2017, Release 14, Version 14.0.0 (Year: 2017).*

(Continued)

*Primary Examiner* — Eric Nowlin
(74) *Attorney, Agent, or Firm* — Shumaker & Sieffert, P.A.

(57) ABSTRACT

A protocol test device for testing protocol compliance of a wireless device under test comprises a wireless interface for transmitting an outgoing RF signal to the wireless device under test and/or for receiving an incoming RF signal from the wireless device under test, a processing unit for generating messages for the outgoing RF signal based on a predefined protocol and for processing messages in the incoming RF signal based on the predefined protocol, a message log memory for storing the generated messages and the received messages, and a summary message generation unit that generates a summary log message and stores the summary log message in the message log memory, wherein the summary log message comprises information about at least one of the generated messages and/or the received messages and repetitions of the respective generated message and/or the respective received message.

18 Claims, 4 Drawing Sheets

(56) References Cited

U.S. PATENT DOCUMENTS

| | | | | |
|---|---|---|---|---|
| 7,181,641 B2* | 2/2007 | Greenwald | G11B 20/1816 | 714/42 |
| 7,617,074 B2 | 11/2009 | Beish et al. | | |
| 8,000,656 B1* | 8/2011 | Jiao | H04B 17/0085 | 455/423 |
| 8,174,991 B1* | 5/2012 | Trivedi | H04L 43/50 | 370/241 |
| 8,472,327 B2* | 6/2013 | DelRegno | H04M 3/301 | 370/249 |
| 8,515,015 B2* | 8/2013 | Maffre | H04L 43/50 | 379/10.01 |
| 8,706,838 B2* | 4/2014 | Sugiyama | H04L 43/04 | 370/328 |
| 8,839,201 B2* | 9/2014 | Schissel | G06F 11/368 | 717/124 |
| 8,938,201 B2* | 1/2015 | Boulton | G01S 5/0221 | 455/67.11 |
| 8,942,127 B2* | 1/2015 | Lu | H04W 24/00 | 370/252 |
| 9,069,749 B1* | 6/2015 | Rumsby | G06F 11/261 | |
| 9,071,989 B2* | 6/2015 | Capers | H04W 24/06 | |
| 9,098,605 B2* | 8/2015 | Kitagawa | G06F 11/327 | |
| 9,451,484 B2* | 9/2016 | Boulton | G01S 5/0221 | |
| 9,521,564 B2* | 12/2016 | Zhao | H04W 24/06 | |
| 9,532,246 B2* | 12/2016 | Michl | H04B 17/0085 | |
| 9,577,772 B2* | 2/2017 | Russ | H04B 17/29 | |
| 9,596,165 B2* | 3/2017 | Moosburger | H04L 43/18 | |
| 9,626,263 B2* | 4/2017 | Senf | G05B 23/0256 | |
| 9,749,064 B2* | 8/2017 | Humphrey | G06F 16/22 | |
| 9,810,735 B2* | 11/2017 | Kumar | G01R 31/31715 | |
| 9,858,634 B2* | 1/2018 | Sterzbach | H04L 43/50 | |
| 10,136,284 B2* | 11/2018 | Palanisamy | H04W 4/70 | |
| 10,291,352 B2* | 5/2019 | Hong | G06F 11/1004 | |
| 10,291,959 B2* | 5/2019 | Kumar | H04L 41/0253 | |
| 10,303,817 B2* | 5/2019 | Sebastian | G01M 17/007 | |
| 10,382,310 B2* | 8/2019 | Fuessel | H04L 43/045 | |
| 2003/0148761 A1* | 8/2003 | Gaal | G01S 19/05 | 455/423 |
| 2004/0059970 A1* | 3/2004 | Wieberdink | G11C 29/56 | 714/724 |
| 2004/0207422 A1* | 10/2004 | Lehtinen | H04B 17/16 | 455/423 |
| 2005/0086336 A1* | 4/2005 | Haber | H04L 1/243 | 709/223 |
| 2005/0165948 A1 | 7/2005 | Hatime | | |
| 2006/0034233 A1* | 2/2006 | Strutt | H04L 45/123 | 370/338 |
| 2006/0154610 A1* | 7/2006 | Rumney | H04W 24/00 | 455/67.14 |
| 2007/0266289 A1* | 11/2007 | Yang | G06F 11/2294 | 714/742 |
| 2008/0287117 A1* | 11/2008 | Olgaard | H04B 17/0085 | 455/423 |
| 2008/0293363 A1* | 11/2008 | Olgaard | H04B 17/0085 | 455/67.7 |
| 2009/0012748 A1 | 1/2009 | Beish et al. | | |
| 2009/0279673 A1* | 11/2009 | Maffre | H04L 43/50 | 379/1.03 |
| 2011/0237199 A1* | 9/2011 | Venkataraman | H04B 17/24 | 455/67.11 |
| 2011/0257923 A1* | 10/2011 | Boulton | G01S 5/0221 | 702/117 |
| 2012/0158895 A1* | 6/2012 | Sugiyama | H04L 43/04 | 709/217 |
| 2013/0121190 A1* | 5/2013 | Lu | H04W 24/00 | 370/252 |
| 2013/0137379 A1* | 5/2013 | Jung | H04W 24/10 | 455/67.11 |
| 2013/0188509 A1* | 7/2013 | Mellein | H04B 17/0085 | 370/252 |
| 2013/0196600 A1* | 8/2013 | Capers | H04W 24/06 | 455/41.2 |
| 2014/0082435 A1* | 3/2014 | Kitagawa | H04W 24/08 | 714/57 |
| 2014/0109063 A1* | 4/2014 | Schissel | G06F 11/368 | 717/127 |
| 2014/0177459 A1* | 6/2014 | Watt | H04L 41/0806 | 370/252 |
| 2014/0274149 A1* | 9/2014 | Alfalujah | H04W 4/025 | 455/456.3 |
| 2015/0051872 A1* | 2/2015 | Arora | G06F 11/3428 | 702/186 |
| 2015/0131470 A1* | 5/2015 | Boulton | G01S 5/0221 | 370/252 |
| 2015/0135017 A1* | 5/2015 | Moosburger | H04L 43/18 | 714/37 |
| 2015/0154729 A1* | 6/2015 | Sterzbach | H04L 43/50 | 345/520 |
| 2015/0181447 A1* | 6/2015 | Zhao | H04W 24/06 | 455/67.11 |
| 2015/0264590 A1* | 9/2015 | Michl | H04W 24/06 | 455/67.14 |
| 2015/0370691 A1* | 12/2015 | Pandey | G06F 11/3672 | 714/38.1 |
| 2016/0012758 A1* | 1/2016 | Coloney | H04W 4/70 | 702/183 |
| 2016/0254871 A1* | 9/2016 | Russ | H04B 17/29 | 455/67.14 |
| 2016/0294668 A1* | 10/2016 | Fuessel | H04L 43/50 | |
| 2016/0357890 A1* | 12/2016 | Arbel | G06F 11/3664 | |
| 2017/0024500 A1* | 1/2017 | Sebastian | G01M 17/007 | |
| 2017/0184698 A1* | 6/2017 | Rueth | G01R 35/007 | |
| 2017/0302994 A1* | 10/2017 | Kumar | H04L 41/0253 | |
| 2018/0024193 A1* | 1/2018 | Kumar | G01R 31/31715 | 714/734 |
| 2018/0034843 A1* | 2/2018 | Diebenbusch | H04L 43/028 | |
| 2018/0034844 A1* | 2/2018 | Diebenbusch | H04L 43/028 | |
| 2018/0034845 A1* | 2/2018 | Diebenbusch | H04L 43/028 | |
| 2018/0081775 A1* | 3/2018 | Powell | H04W 4/70 | |
| 2018/0124083 A1* | 5/2018 | Uchiyama | H04L 63/145 | |
| 2019/0034630 A1* | 1/2019 | Khatri | G06F 21/56 | |
| 2019/0245632 A1* | 8/2019 | Sterzbach | H04B 17/0085 | |

OTHER PUBLICATIONS

U.S. Appl. No. 15/594,576, filed by Alexander Tyrrell et al., filed May 13, 2017.

Office Action from U.S. Appl. No. 15/594,576, dated Nov. 23, 2018, 27 pp.

Response filed Feb. 25, 2019 to Office Action from U.S. Appl. No. 15/594,576, dated Nov. 23, 2018.

Final Office Action from U.S. Appl. No. 15/594,576, dated May 1, 2019, 35 pp.

Response to Office Action from U.S. Appl. No. 15/594,576, dated May 1, 2019, filed Jul. 26, 2019, 10 pp.

* cited by examiner

PROTOCOL TEST DEVICE AND METHOD FOR OPERATING A PROTOCOL TEST DEVICE

TECHNICAL FIELD

The present invention relates to a protocol test device. The present invention further relates to a method for operating a protocol test device.

BACKGROUND

Although applicable in principle to any system that measures data, the present invention and its underlying problem will be hereinafter described in combination with protocol testers for wireless devices.

Modern wireless devices may comprise a plurality of high frequency elements and handle data and analogue signals at frequencies of up to several GHz.

In order to verify compliance of such wireless devices with legal regulations and standards, extensive testing of these wireless devices is necessary during development, production, and in the field.

Specific tests have to be performed to verify the compliance of the wireless devices with the protocol standards of the respective communication standard. This ensures that the wireless device integrates into the respective wireless ecosystem and doesn't interfere with the data communication of the further devices in the respective wireless system.

Testing the protocol compliance of wireless devices requires logging the messages that are exchanged by the wireless devices.

Against this background, the problem addressed by the present invention is providing an improved log data handling.

SUMMARY

The present invention solves this object by a protocol test device with the features of claim 1, and by a method with the features of claim 11.

Accordingly it is provided:

A protocol test device for testing protocol compliance of a wireless device under test, the protocol test device comprising a wireless interface for transmitting an outgoing RF signal to the wireless device under test and/or for receiving an incoming RF signal from the wireless device under test, a processing unit for generating messages for the outgoing RF signal based on a predefined protocol and for processing messages in the incoming RF signal based on the predefined protocol, a message log memory for storing the generated messages and the received messages, and a summary message generation unit that generates a summary log message and stores the summary log message in the message log memory, wherein the summary log message comprises information about at least one of the generated messages and/or the received messages, and repetitions of the respective generated message and/or the respective received message.

Further it is provided:

A method for operating a protocol test device for testing protocol compliance of a wireless device under test, the method comprising transmitting an outgoing RF signal to the wireless device under test, receiving an incoming RF signal from the wireless device under test, generating messages for the outgoing RF signal based on a predefined protocol, processing messages in the incoming RF signal based on the predefined protocol, storing the generated messages and the received messages, and generating and storing, e.g. in the massage log, a summary log message, wherein the summary log message comprises information about at least one of the generated messages and/or the received messages, and repetitions of the respective generated message and/or the respective received message.

When testing the protocol compliance of a wireless device with a predetermined communication standard or protocol, the protocol test device may e.g. simulate a communication partner of the respective wireless device under test and provide the wireless device under test with an outgoing RF signal that contains messages according to the predetermined communication standard or protocol. As a response the device under test will provide the protocol test device with an incoming RF signal that comprises messages generated by the device under test.

The predetermined communication standard or protocol will at least in some situations, like e.g. connection establishment, require a fixed sequence of messages with a predetermined content to be exchanged between the protocol test device and the device under test.

In addition, certain messages may be repeated in various frames. Frames in this context may e.g. refer to data frames as a unit of data transmission in the wireless communication according to the predetermined communication standard or protocol. A frame may therefore comprise at least one message.

If a specific message is repeated a certain number of times it becomes inefficient to handle the single repetitions in the log of messages separately either in an automated log analyzer or for a human, e.g. a test engineer.

Therefore, the protocol test device comprises a summary message generation unit that will summarize the repetitions of single messages during the communication and store respective summary log messages in the message log memory. It is understood, that the summary log messages may also comprise additional information, like e.g. the message type or the like.

A possible protocol that uses such repeated messages may e.g. be the 3GPP LTE Release 13 protocol.

With the summary log message the analysis following the recording of the log, i.e. the transmitted and received messages, is greatly simplified, since it is not necessary to parse the entire message log memory for repetitions of single messages. Instead the information about repeated messages may simply be extracted from the summary log message.

Further embodiments of the present invention are subject of the further subclaims and of the following description, referring to the drawings.

In a possible embodiment, the summary message generation unit may comprise a message buffer for storing the information about predetermined types of messages and their repetitions.

The message buffer may e.g. be a two dimensional array, where each row refers to a single message type. The columns may then refer to the single repetitions of the messages. This allows efficiently handling the single messages.

The maximum number of repetitions may e.g. be predetermined by the respective communication standard. The size of the message buffer or the two dimensional array, respectively, may therefore be adapted accordingly.

In a possible embodiment, the information that the summary message generation unit includes in the summary log message about at least one of the generated messages and/or the received messages and their repetitions may comprise frame numbers and/or sub-frame numbers of the respective message and its repetitions.

As indicated above frames or data frames may be seen as a unit of data transmission. Sub-frames may be a subdivision of such data frames, e.g. time slots of a predefined length in a single frame.

Usually the length of a frame will be predetermined by the respective communication standard. Knowing the frame number or sub-frame number of the frames or sub-frames that carried a message therefore allows analyzing and reconstructing the timing of the single messages.

In a possible embodiment, the information that the summary message generation unit includes in the summary log message about at least one of the generated messages and/or the received messages and their repetitions may comprise the number of repetitions of the respective message.

The number of repetitions for specific message types may be predefined by a communication standard or by configuration options of the communication standard. For example in the 3GPP LTE Release 13 Standard certain message types may be repeated between 1 and 2048 times.

The summary message generation unit may e.g. comprise counters for counting the numbers of repetitions of the respective messages.

Knowing the number of repetitions allows easily comparing the actual number of times a message was repeated to the predefined number of times that the message should be repeated. Non-conforming data transmissions of the device under test may therefore easily be detected.

In a possible embodiment, the information that the summary message generation unit includes in the summary log message about at least one of the generated messages and/or the received messages and their repetitions may comprise pointers to the first occurrence and/or the repetitions of the respective message in the message log memory.

Pointers, also called links or indicators, to the original message in the message log memory allow easily retrieving the full message or its content starting from the summary log message. If for example any irregularities are detected in the summary log message the full messages may then be retrieved and analyzed in detail.

In a possible embodiment, the protocol test device may comprise a display device that displays the content of the message log memory and comprises a user interface for navigating the message log memory.

The display device may e.g. be a screen or a touchscreen of the protocol test device and display the message log e.g. in tabular form to a user. The user may use the user interface for navigating the content of the message log memory, i.e. the message log.

The user interface allows a user to comfortably parse the contents of the message log memory.

In a possible embodiment, the protocol test device may comprise a protocol analyzer that analyzes the summary log message and adds respective conformity markers to the summary log message.

The conformity markers may indicate whether the respective message and its repetitions conform to the respective communication standard or not. The protocol analyzer may e.g. analyze the contents of the summary log message to identify the distance between single message repetitions and verify it the identified distance conforms to the respective communication standard. Distance in this context may refer to the distance measured in frames, i.e. the number of the frame with the second message repetition minus the number of the frame with the first message repetition.

The conformity markers allow quickly scanning for irregularities in the communication with the device under test without having to parse the full content of the message log memory.

In a possible embodiment, the protocol analyzer may be coupled to the processing unit and may receive from the processing unit configuration parameters for the communication with the device under test, wherein the protocol analyzer may analyze the summary log message according to the received parameters.

The configuration parameters may e.g. refer to specific message types that should be repeated during the communication with the device under test and may further specify the number of repetitions and the spacing between repetitions, e.g. as number of frames. With this information the protocol analyzer may be configured by the processing unit automatically without e.g. a user having to provide this information to the protocol analyzer manually.

In a possible embodiment, the conformity markers may comprise a binary flag and/or the conformity markers may comprise visual indications.

The digital binary flag may e.g. be a single bit in the message log memory or the summary log message. Such flags may be easily evaluated e.g. by following signal processing units in the protocol test device.

The visual indications in contrast allow a user to quickly identify non-conforming messages or communication sequences.

In a possible embodiment, the summary message generation unit may comprise at least one interface to respective layers of a communication stack implemented in the processing unit, the interfaces allowing the summary message generation unit to intercept the generated messages and/or the received messages.

The processing unit may e.g. comprise at least part of the layers of a communication stack. The communication stack may e.g. be a communication stack according to the OSI layer model or at least be loosely based on the OSI layer model.

The interfaces may provide the summary message generation unit with access to the data that is exchanged between the layers and therefore to the received or incoming messages and the generated or outgoing messages. Using the interfaces allows using an already present communication stack with minimal changes to the stack and does not require a full rewrite of the communication stack.

The protocol test device may comprise a combination of hardware components, like e.g. general purpose processors, programmable logic devices, like e.g. FPGAs, microcontrollers and analogue circuitry or the like, and computer readable instructions, like e.g. an operating system with respective applications, firmware, hardware description or the like. The wireless interface may comprise digital and analogue components that are required to convert a digital data stream into analogue signals that may be transmitted via an antenna and to convert received analogue signals into a digital data stream. Such components may e.g. comprise filters, amplifiers, attenuators or the like. The processing unit may be any kind of processor or processing device that may handle the respective tasks. The processing unit may also comprise computer readable instructions, e.g. in the form of an application program that is executed by a processing unit. The summary message generation unit may also comprise a combination of digital and analogue components that are necessary to perform the function of the summary message generation unit. The summary message generation unit may e.g. comprise interfaces to respective layers of the communication stack that is implemented in the protocol test device. The interfaces would allow the summary message generation unit to intercept the incoming and outgoing messages and populate the message log memory.

The message log memory may be any type of memory, like e.g. a RAM memory, a hard disk, a mobile storage like a USB stick. The message log memory may also be e.g. a file in a file system on a hardware memory, or a database or the like.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
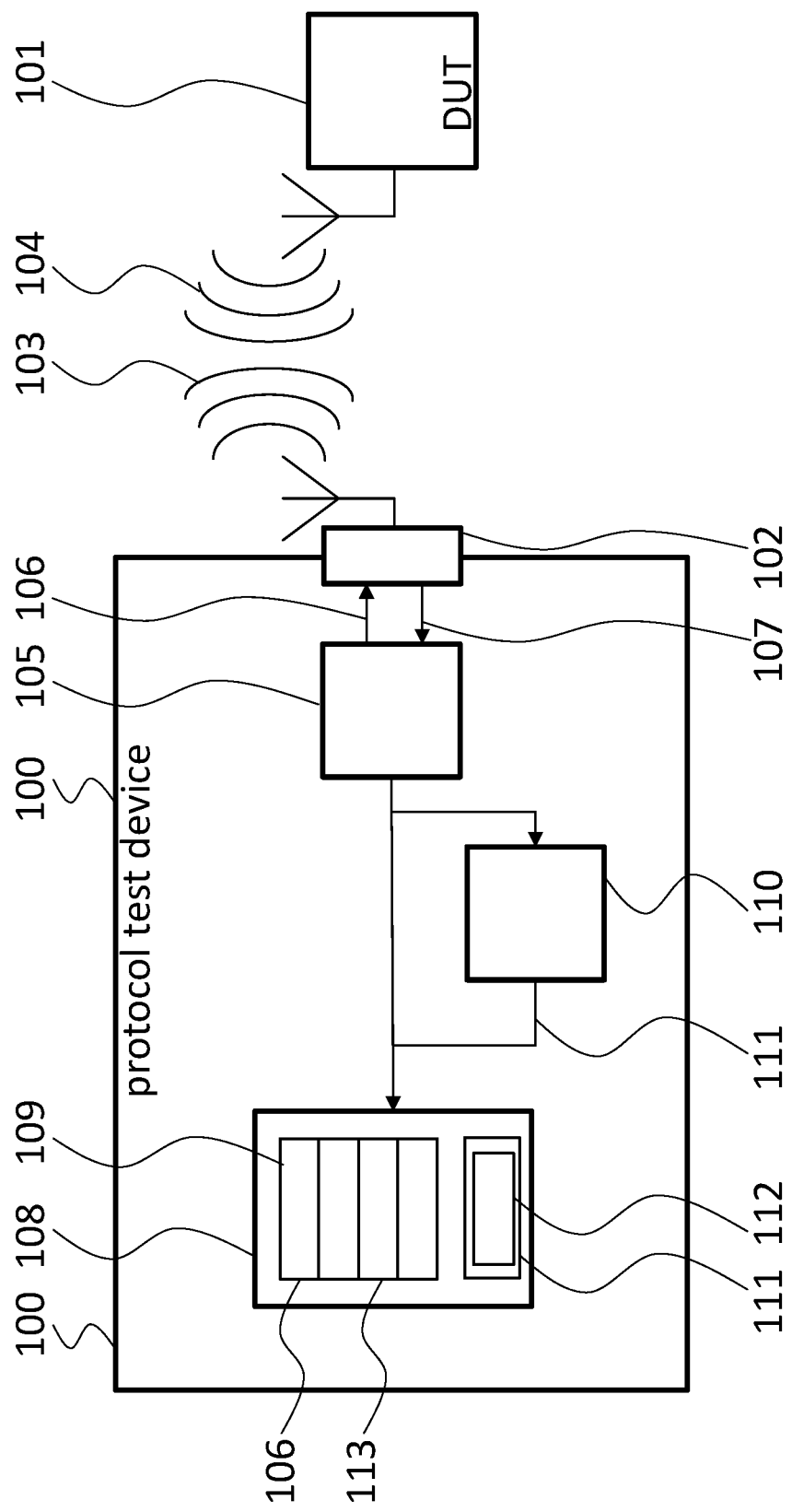
FIG. 1 shows a block diagram of an embodiment of a protocol test device according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

FIG. 1 shows a block diagram of a protocol test device 100. The protocol test device 100 serves for testing protocol compliance of a wireless device under test 101, e.g. an IoT device or a mobile phone or the like.

The protocol test device 100 comprises a wireless interface 102 that is coupled to a processing unit 105. The protocol test device 100 further comprises a message log memory 108 that is coupled to the processing unit 105, and a summary message generation unit 110 that is coupled to the processing unit 105 and the message log memory 108.

The wireless interface 102 sends an outgoing RF signal 103 and receives an incoming RF signal 104. The outgoing RF signal 103 may e.g. comprise outgoing messages 106 and the incoming RF signal 104 may comprise incoming messages 107.

The outgoing messages 106 are generated by the processing unit 105 of the protocol test device 100 and the incoming messages 107 are processed by the protocol test device 100.

Although shown as separate units, the processing unit 105 and the wireless interface 102 may at least partially be a single component. The processing unit 105 may e.g. comprise the digital logic that is necessary to encode the outgoing messages 106 or decode the incoming messages 107. The wireless interface 102 may comprise the D/A converters and analogue circuitry that is necessary to convert the digital signals from the processing unit 105 into the outgoing RF signal 103. The wireless interface 102 may also comprise A/D converters and the analogue circuitry that is necessary to convert the incoming RF signal 104 into a digital signal for processing by the processing unit 105.

The processing unit 105 further provides the outgoing messages 106 and incoming messages 107 to the message log memory 108 that stores a message log 109. The message log 109 comprises the outgoing messages 106 and incoming messages 107 that have been sent during the test of the wireless device under test 101.

The summary message generation unit 110 also receives the outgoing messages 106 and incoming messages 107 from the processing unit 105. Alternatively, the summary message generation unit 110 may also retrieve the outgoing messages 106 and incoming messages 107 from the message log memory 108. The summary message generation unit 110 analyzes the outgoing messages 106 and incoming messages 107 and generates a summary log message 111. The summary log message 111 contains information 112 about the outgoing messages 106 and the incoming messages 107, and especially about repetitions 113 of the outgoing messages 106 or incoming messages 107. In FIG. 1 the repetition 113 of message 106 is just schematically shown as a placeholder for a plurality of possible repetitions.

The information 112 that the summary message generation unit 110 includes in the summary log message 111 refers to at least one of the generated messages 106 or one of the received messages 107 and the respective repetitions 113. The information 112 may e.g. comprise frame numbers and/or sub-frame numbers of the respective message 106, 107 and its repetitions 113. The information 112 may also comprise the number of repetitions 113 of the respective message 106, 107. In addition the information 112 may also comprise pointers to the first occurrence and/or the repetitions 113 of the respective message 106, 107 in the message log memory 108.

Figure 2:
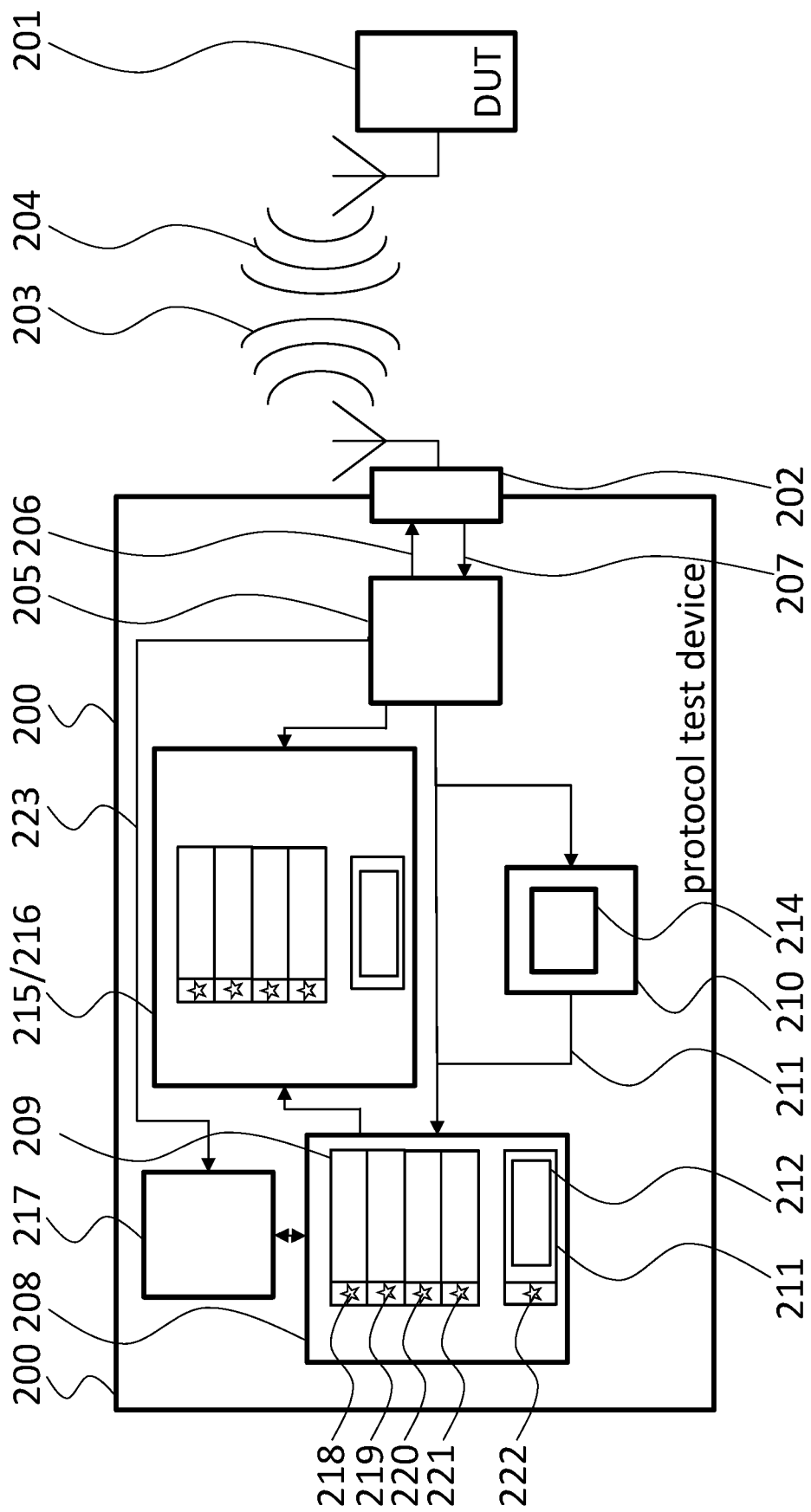
FIG. 2 shows a block diagram of another embodiment of a protocol test device according to the present invention.

FIG. 2 shows a block diagram of another protocol test device 200. The protocol test device 200 is based on the protocol test device 100 and therefore comprises a wireless interface 202 that is connected to the processing unit 205, and a message log memory 208 together with the summary message generation unit 210.

The summary message generation unit 210 comprises a message buffer 214 that allows the summary message generation unit 210 to buffer the single outgoing messages 206 and incoming messages 207 for faster processing.

The protocol test device 200 further comprises a display device 215. The display device 215 of the protocol test device 200 is a touchscreen and at the same time serves as user interface 216. It is understood that instead of a touchscreen 215, 216 any other separate display and user interface arrangement is also possible.

The display device 215 serves for displaying the message log 209 from the message log memory 208 to a user. The user interface 216 allows the user to navigate the message log 209 and e.g. select single messages 106, 107 for displaying the details of the respective message 106,107. The message log 209 may e.g. be displayed in tabular form and show a type and a frame number of a respective message 106, 107. If a user selects a line of the table the line may e.g. be expanded and show more details of the respective message 106, 107.

The display device 215 may also show the summary log message 211 with the information 212. In FIG. 2 the summary log message 211 is shown separated from the messages 106, 107, however, any other arrangement would also be possible.

In addition, instead of a single summary log message 211 for all message types, a single summary log message 211 may be provided for every message type that is processed in the summary log message 211.

The protocol test device 200 further comprises a protocol analyzer 217. The protocol analyzer 217 analyzes at least one of the outgoing messages 206, the incoming messages 207 and the summary log message 211 in the message log memory 208 and determines if they conform to a protocol that is used for data transmission with the wireless device under test 201. In order to analyze the outgoing messages 206, the incoming messages 207 and the summary log message 211, the protocol analyzer 217 receives the configuration parameters 223 of the communication with the wireless device under test 201 from the processing unit 205. The configuration parameters 223 may e.g. determine which type of message is repeated during the communication and in which frames.

After analyzing the outgoing messages 206, incoming messages 207 and the summary log message 211 the protocol analyzer 217 provides a conformity marker 218-222 for every message. The conformity marker 218-222 indicates if the respective message 206, 207, 211 conforms to the configuration parameters 223, and may e.g. be a binary flag or a colored indicator that may be shown to the user.

Figure 3:
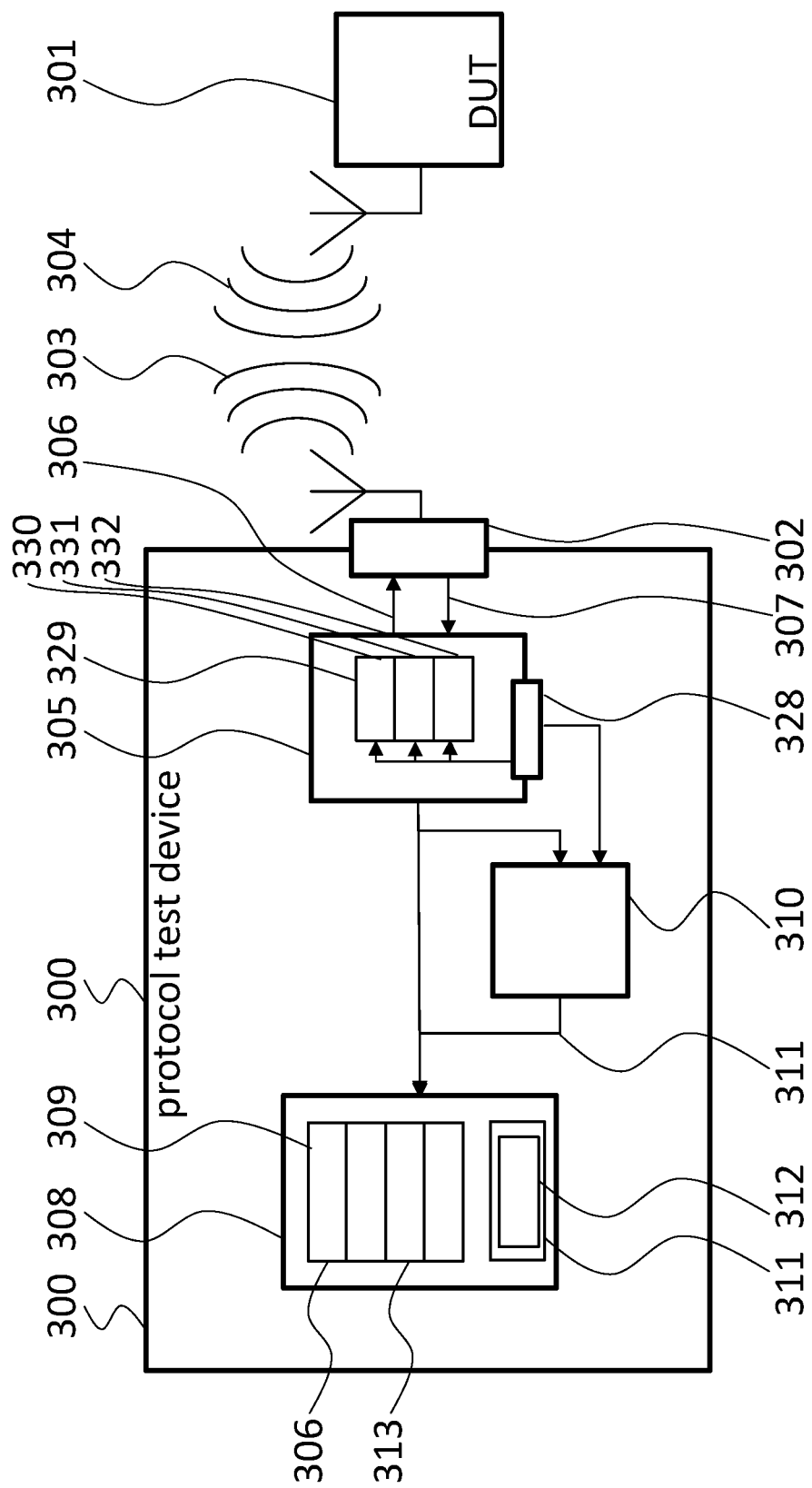
FIG. 3 shows a block diagram of another embodiment of a protocol test device according to the present invention.

FIG. 3 shows a block diagram of another protocol test device 300. The protocol test device 300 is based on the protocol test device 100 and therefore comprises a wireless interface 302 that is connected to the processing unit 305, and a message log memory 308 together with the summary message generation unit 310.

In the protocol test device 300 the processing unit 305 comprises a protocol or communication stack 329. The communication stack 329 is just exemplarily shown as comprising three layers 330, 331, 332. It is understood that the layers 330, 331, 332 are just schematically and exemplarily shown. The communication stack 329 may e.g. be any communication stack 329, especially a communication stack 329 conforming to or at least loosely based on the OSI layer model.

An interface 328 is provided at the processing unit 305 that allows the summary message generation unit 310 to directly access the different layers 330, 331, 332 and e.g. extract the outgoing messages 306 and incoming messages 307.

It is understood, that the protocol test device 100, the protocol test device 200 and the protocol test device 300 are just exemplary devices and that their features may be freely combined.

For example the interface 328 may be used with the protocol test device 200, the display device 215 and the user interface 216 may be used with the protocol test device 100 or the protocol test device 300. The same applies to the protocol analyzer 217.

For sake of clarity in the following description of the method based FIG. 4 the reference signs used above in the description of apparatus based FIGS. 1-3 will be maintained.

Figure 4:
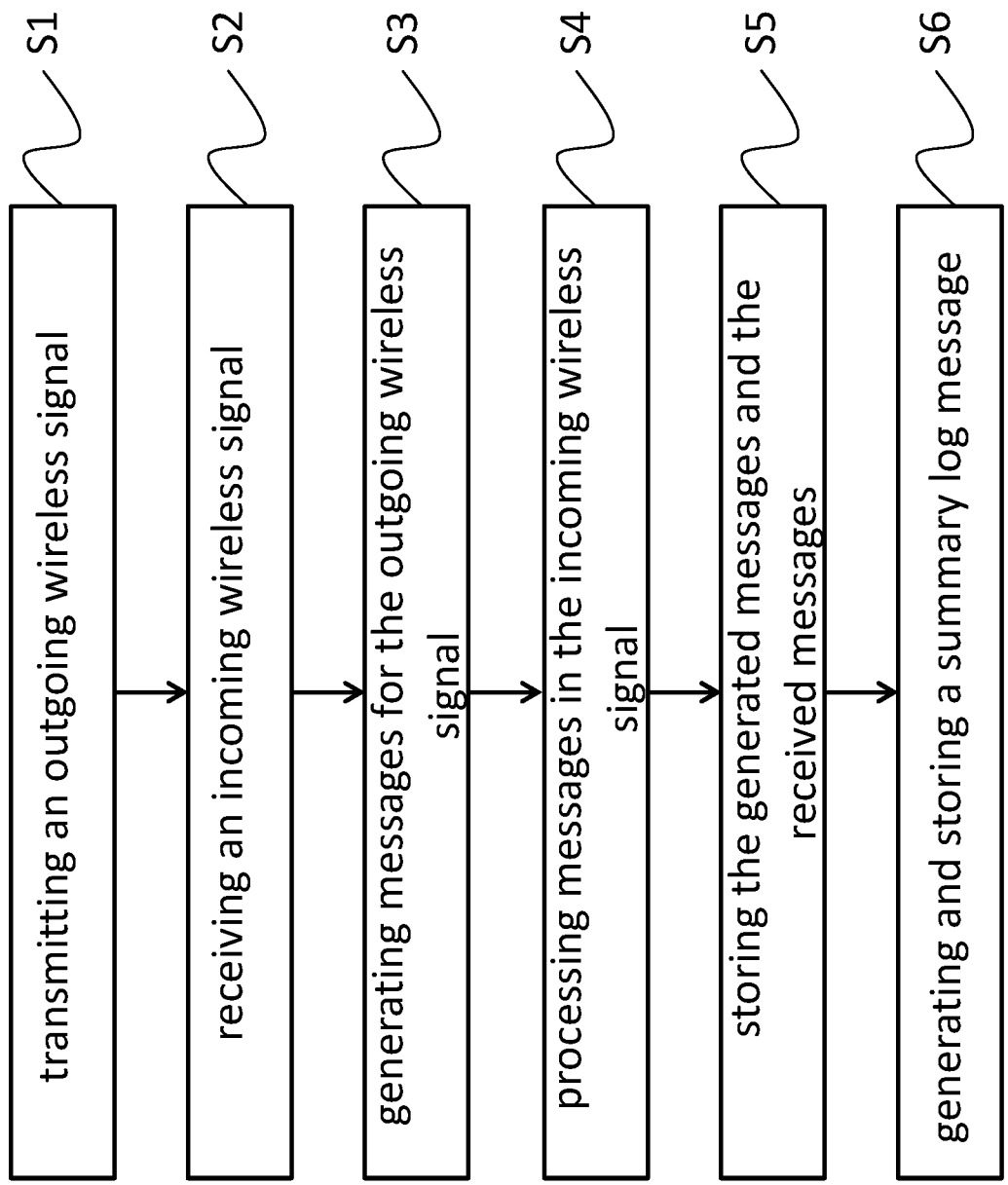
FIG. 4 shows a flow diagram of an embodiment of a method according to the present invention.

FIG. 4 shows a flow diagram of a method for operating a protocol test device 100, 200, 300 for testing protocol compliance of a wireless device under test 101, 201, 301.

The method comprises transmitting S1 an outgoing RF signal 103, 203, 303 to the wireless device under test 101, 201, 301, and receiving S2 an incoming RF signal 104, 204, 304 from the wireless device under test 101, 201, 301.

Messages 106, 206, 306 are generated S3 for the outgoing RF signal 103, 203, 303 based on a predefined protocol, and messages 107, 207, 307 in the incoming RF signal 104, 204, 304 are processed S4 based on the predefined protocol.

The method further comprises storing S5 the generated messages 106, 206, 306 and the received messages 107, 207, 307 in a message log 109, 209, 309.

Finally a summary log message 111, 211, 311 is generated and stored S6, wherein the summary log message 111, 211, 311 comprises information 112, 212, 312 about at least one of the generated messages 106, 206, 306 and/or the received messages 107, 207, 307 and repetitions 113, 313 of the respective generated message 106, 206, 306 and/or the respective received message 107, 207, 307.

Generating the summary log message 111, 211, 311 may comprise storing the information 112, 212, 312 about predetermined types of messages 106, 107, 206, 207, 306, 307 and their repetitions 113, 313 in a temporary buffer prior to storing the summary log message 111, 211, 311. Further, generating the summary log message 111, 211, 311 may comprise intercepting the generated messages 106, 206, 306 and/or the received messages 107, 207, 307 from layers 330, 331, 332 of a communication stack 329 implemented in the protocol test device 100, 200, 300.

The information 112, 212, 312 included in the summary log message 111, 211, 311 about at least one of the generated messages 106, 206, 306 and/or the received messages 107, 207, 307 and their repetitions 113, 313 may e.g. comprise at least one of frame numbers and/or sub-frame numbers of the respective message 106, 107, 206, 207, 306, 307 and its repetitions 113, 313, the number of repetitions 113, 313 of the respective message 106, 107, 206, 207, 306, 307, and pointers to the first occurrence and/or the repetitions 113, 313 of the respective message 106, 107, 206, 207, 306, 307 in the message log 109, 209, 309.

To facilitate the evaluation of the message log 109, 209, 309 the method may further comprise analyzing the summary log message 111, 211, 311 and adding respective conformity markers 218-222 to the summary log message 111, 211, 311.

Analyzing the summary log message 111, 211, 311 may e.g. be performed according to configuration parameters 223 for the communication with the wireless device under test 101, 201, 301. The conformity markers 218-222 may comprise a binary flag that is easily machine readable. In addition or as alternative the conformity markers 218-222 may comprise visual indications.

The method may further comprise displaying the content of the message log 109, 209, 309 and receiving a user input for navigating the message log 109, 209, 309.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300 protocol test device
101, 201, 301 wireless device under test
102, 202, 302 wireless interface
103, 203, 303 outgoing RF signal
104, 204, 304 incoming RF signal
105, 205, 305 processing unit
106, 107, 206, 207, 306, 307 message
108, 208, 308 message log memory
109, 209, 309 message log
110, 210, 310 summary message generation unit
111, 211, 311 summary log message
112, 212, 312 information
113, 313 repetition
214 message buffer
215 display device
216 user interface
217 protocol analyzer
218-222 conformity markers
223 configuration parameters
328 interface
329 communication stack
330, 331, 332 layer
S1-S6 method steps

The invention claimed is:

1. A protocol test device for testing protocol compliance of a wireless device under test, the protocol test device comprising:
a RF interface for transmitting an outgoing RF signal to the wireless device under test or for receiving an incoming RF signal from the wireless device under test,
a processing unit for generating messages for the outgoing RF signal based on a predefined protocol and for processing messages in the incoming RF signal based on the predefined protocol,
a message log memory for storing the generated messages and the received messages,
a summary message generation unit that generates a summary log message and stores the summary log message in the message log memory, wherein the summary log message comprises information about the generated messages and repetitions of the respective generated message, or information about the received messages and repetitions of the respective received message, wherein the information that the summary message generation unit includes in the summary log message about the generated messages and the repetitions of the respective generated messages, or the received messages and the repetitions of the respective received messages, comprises the number of repetitions of the respective message, wherein the number of repetitions is predefined by a communication standard, and
a protocol analyzer that analyzes the summary log message that detects non-conforming data transmissions without parsing the entire message log memory for repetitions of single messages.

2. The protocol test device according to claim 1, wherein the summary message generation unit comprises a message buffer for storing the information about predetermined types of messages and the repetitions of the messages.

3. The protocol test device according to claim 1, wherein the information that the summary message generation unit includes in the summary log message about the generated messages and the repetitions of the respective generated messages, or the received messages and the repetitions of the respective received messages comprises frame numbers or sub-frame numbers of the respective message and its repetitions.

4. The protocol test device according to claim 1, wherein the information that the summary message generation unit includes in the summary log message about the generated messages and the repetitions of the respective generated messages, or the received messages and the repetitions of the respective received messages comprises pointers to the first occurrence or the repetitions of the respective message in the message log memory.

5. The protocol test device according to claim 1, comprising a display device that displays content of the message log memory and comprises a user interface for navigating the message log memory.

6. The protocol test device according to claim 1, wherein the protocol analyzer adds respective conformity markers to the summary log message.

7. The protocol test device according to claim 6, wherein the protocol analyzer is coupled to the processing unit and receives from the processing unit configuration parameters for the communication with the wireless device under test, wherein the protocol analyzer analyzes the summary log message according to the received parameters.

8. The protocol test device according to claim 6, wherein the conformity markers comprise a binary flag or wherein the conformity markers comprise visual indications.

9. The protocol test device according to claim 1, wherein the summary message generation unit comprises at least one interface to respective layers of a communication stack implemented in the processing unit, the interfaces allowing the summary message generation unit to intercept the generated messages or the received messages.

10. A method for operating a protocol test device for testing protocol compliance of a wireless device under test, this method comprising:

transmitting an outgoing RF signal to the wireless device under test,
receiving an incoming RF signal from the wireless device under test,
generating messages for the outgoing RF signal based on a predefined protocol,
processing messages in the incoming RF signal based on the predefined protocol,
storing the generated messages and the received messages in a message log,
generating and storing a summary log message, wherein the summary log message comprises information about the generated messages and repetitions of the respective generated message, or information about the received messages and repetitions of the respective received message, wherein the information included in the summary log message about the generated messages and the repetitions of the respective generated messages, or the received messages and the repetitions of the respective received messages, comprises the number of repetitions of the respective message, wherein the number of repetitions is predefined by a communication standard, and
detecting non-conforming data transmissions without parsing the entire message log for repetitions of single messages.

11. The method according to claim 10, wherein generating comprises storing the information about predetermined types of messages and the repetitions of the messages in a temporary buffer prior to storing the summary log message.

12. The method according to claim 10, wherein the information included in the summary log message about the generated messages and the repetitions of the respective generated messages, or the received messages and the repetitions of the respective received messages comprises frame numbers or sub-frame numbers of the respective message and its repetitions.

13. The method according to claim 10, wherein the information included in the summary log message about the generated messages and the repetitions of the respective generated messages, or the received messages and the repetitions of the respective received messages comprises pointers to the first occurrence or the repetitions of the respective message in the message log.

14. The method according to claim 10, comprising displaying content of the message log and receiving a user input for navigating the message log.

15. The method according to claim 10, comprising adding respective conformity markers to the summary log message.

16. The method according to claim 15, wherein analyzing comprises receiving configuration parameters for the communication with the wireless device under test, and analyzing the summary log message according to the received parameters.

17. The method according to claim 15, wherein the conformity markers comprise a binary flag or wherein the conformity markers comprise visual indications.

18. The method according to claim 10, wherein generating the summary log message comprises intercepting the generated messages or the received messages from layers of a communication stack implemented in the protocol test device.

* * * * *